United States Patent
Rayhons

(10) Patent No.: US 8,328,002 B2
(45) Date of Patent: Dec. 11, 2012

(54) SCOPING AUGER

(76) Inventor: Marvin Rayhons, Garner, IA (US)

( * ) Notice: Subject to any disclaimer, the term of this patent is extended or adjusted under 35 U.S.C. 154(b) by 207 days.

(21) Appl. No.: 12/792,314

(22) Filed: Jun. 2, 2010

(65) Prior Publication Data

US 2010/0300845 A1    Dec. 2, 2010

Related U.S. Application Data

(60) Provisional application No. 61/183,094, filed on Jun. 2, 2009.

(51) Int. Cl.
*B65G 33/32* (2006.01)

(52) U.S. Cl. .................................. 198/666; 198/594

(58) Field of Classification Search .......... 198/657–677, 198/594
See application file for complete search history.

(56) References Cited

U.S. PATENT DOCUMENTS

| | | | | |
|---|---|---|---|---|
| 2,588,006 A * | 3/1952 | Hufnagel | ...................... | 433/123 |
| 2,845,167 A * | 7/1958 | Heiken | ......................... | 198/660 |
| 3,575,306 A * | 4/1971 | Obermeyer et al. | .......... | 414/523 |
| 3,593,844 A * | 7/1971 | Barclay et al. | ................. | 198/661 |
| 4,356,910 A * | 11/1982 | Togstad | ........................ | 198/660 |
| 5,099,986 A * | 3/1992 | Kuzub | ........................... | 198/666 |
| 5,875,882 A * | 3/1999 | Pollock | ........................ | 198/674 |
| 7,428,956 B2 * | 9/2008 | Scherman | ...................... | 198/312 |
| 7,946,416 B2 * | 5/2011 | Grose et al. | ................... | 198/671 |

* cited by examiner

*Primary Examiner* — Mark A Deuble
(74) *Attorney, Agent, or Firm* — Davis Brown Law Firm; Kent A. Herink

(57) ABSTRACT

A scoping auger of adjustable length is described. The scoping auger includes two conventional augers interconnected to each other in with a sliding connection mounting the two augers to each other with their longitudinal axes parallel with one auger section above the other. A longitudinally extended opening is formed in the top of the auger tube of the lower auger section so that particulate material being conveyed by the upper auger section can be deposited for further conveying of the particulate material anywhere within the length of the opening.

2 Claims, 2 Drawing Sheets

SCOPING AUGER

BACKGROUND OF THE INVENTION

This application claims priority to U.S. Patent Application Ser. No. 61/183,094, filed Jun. 2, 2009, which is incorporated herein by this reference.

The invention relates generally to augers and, more specifically, to an auger that is extensible between a range of lengths.

Augers are in wide use to convey particulate materials, such as grain. An auger comprises a helical flighting mounted on an elongate drive member so that the flighting is rotated around the axis of the drive member. The flighting is mounted within a confining member or shroud which may be in the form of a tube, or may have one side open and cooperates with the flighting to force the material longitudinally of the axis. Known augers are of a fixed length, to convey materials from a fixed inlet point to a fixed outlet point. It is desirable to have an auger of an adjustable length so that the auger can be configured to work in a wider variety of situations.

SUMMARY OF THE INVENTION

The present invention consists of an auger of adjustable length. A pair of fixed length auger sections are slidably interconnected so that the output of the first fixed length auger section dispenses conveyed particulate material at an adjustable position of the second fixed length auger section. Roller bearings are supported in nested channels of the two fixed length augers to provide for easy sliding movement between the two auger sections. A linear actuator, such as a hydraulic cylinder, provides the motive force to move the auger sections relative to each other. A cover plate slides with the first auger section to prevent material being conveyed from exiting the intersection of the two auger sections.

DESCRIPTION OF THE INVENTION

Figure 1:
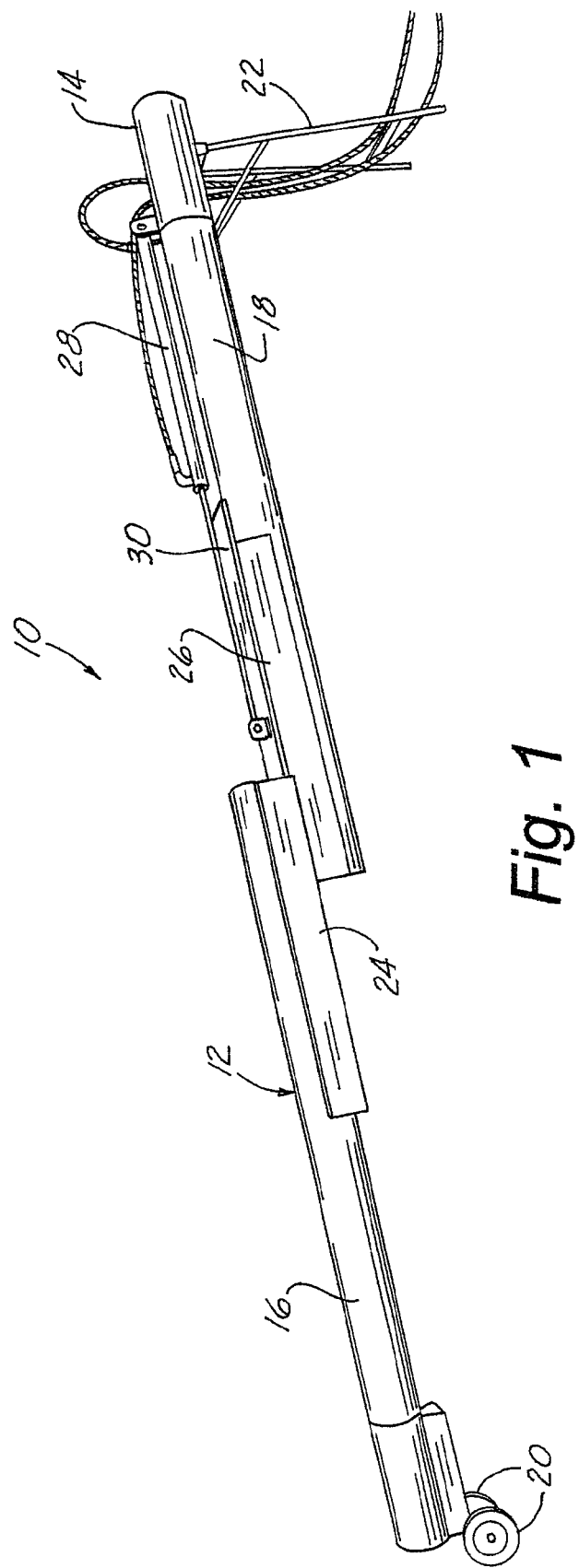
FIG. 1 is an elevational view of a preferred embodiment of the present invention adjusted to a first length.

Illustrated in FIG. 1, generally at 10 is a scoping auger of the present invention. A first auger section 12 is interconnected to a second auger section 14 for relative sliding movement between the two sections 12 and 14 to result in adjusting the length of scoping auger 10 between a range of lengths.

Each auger section 12, 14 has a tube 16, 18 in which rotates a drive shaft with helical fighting (not shown) as is well known in the art. The drive shafts are connected to motors for rotating of the drive shafts to result in conveyance of particulate matter inside and along the tubes 16, 18 in a generally upward direction, from left to right. In the embodiment illustrated in the figures, the input end of the auger section 12 is supported on the ground by a pair of wheels 20, and the output end of the auger section 14 is supported on the ground by a pair of legs 22.

The output end portion of the first auger section 12 has been modified from that of a conventional auger. A portion of the tube 16 along the bottom of the output end portion has been removed to create an opening so that particulate matter being conveyed by the auger section 12 can exit the auger section 12. A pair of channels 24 are affixed longitudinally to the auger tube 16 on either side of the opening. The input end portion of the second auger section 14 has been similarly modified. A portion of the tube 18 along the top of the input end portion has been removed to create an opening so that particulate matter being conveyed by the auger section 12 can enter the auger section 14. A pair of channels 26 are affixed longitudinally to the auger tube 18 on either side of the opening.

The channels 24 and 26 are adapted so that they are received in sliding engagement with each other. A set of bearings, for example roller bearings, are interposed between the channels 24 and 26 to ease sliding of the channels relative to each other.

Figure 2:
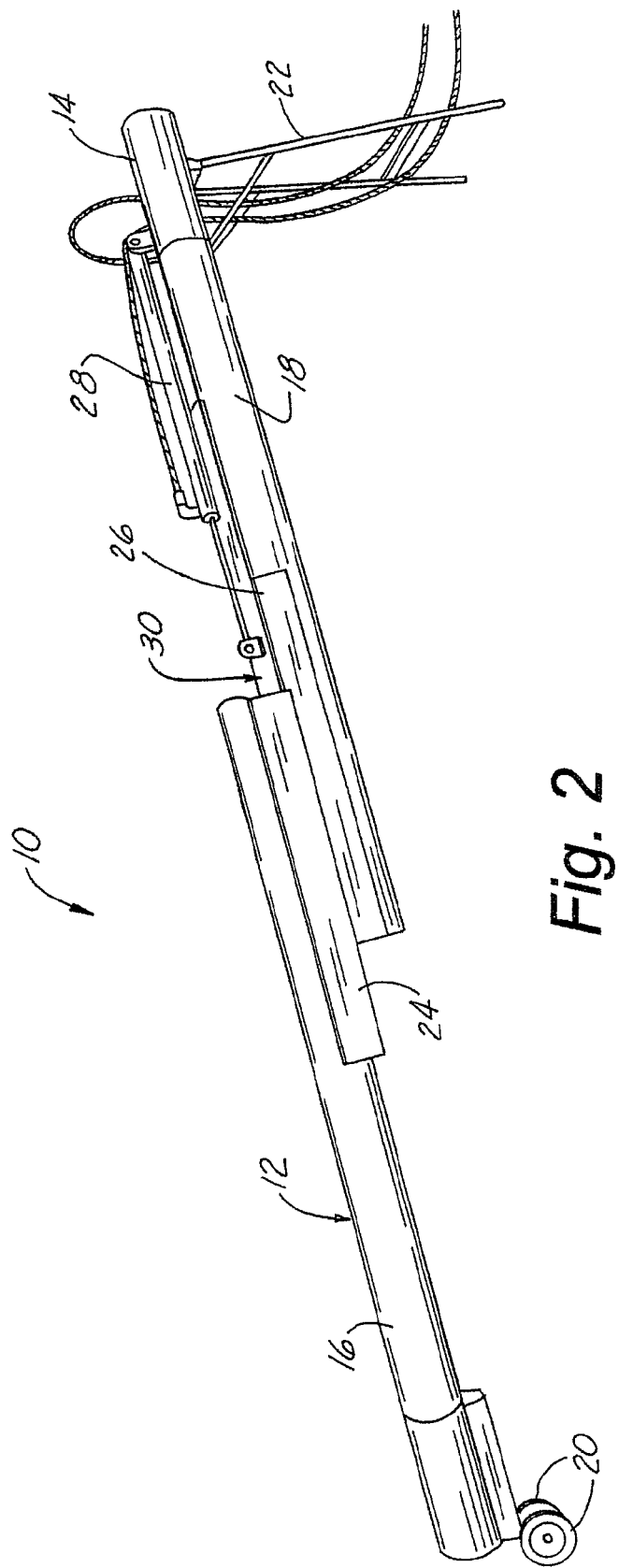
FIG. 2 is an elevational view of the embodiment of FIG. 1 adjusted to a second, shorter length.

In the illustrated embodiment, a hydraulic cylinder 28 is mounted on the auger section 14 and extends longitudinally to connect with the output end of the first auger section 12. Extension and retraction of the hydraulic cylinder 28 will result in extension and retraction of the scoping auger 10. In the illustrated embodiment, it will be appreciated that the second auger section 14 is on a fixed support so that extension of the hydraulic cylinder 28 will move the input end of the first auger section 12 from the position shown in FIG. 2 away from the legs 22 on the wheels 20 to a position shown in FIG. 1.

A sliding cover plate 30 is mounted in the channels 26 and slides with the second auger section 14 to cover the opening of the auger tube 18 above the output end of the first auger section 12.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

I claim:

1. A telescoping auger, comprising:
   a. a first auger section having an input end and an output end;
   b. a second auger section having an input end and an output end;
   c. a longitudinal channel on the output end portion of the first auger section;
   d. a longitudinal channel on the input end portion on the upper side of the second auger section in cooperative sliding engagement with the longitudinal channel of the on the lower side of the first auger section whereby the end portion of the first auger section is slidingly engaged above the second auger section; and
   e. an opening in the input end portion of the second auger section for receiving material conveyed by the first auger section out of its output end.

2. The auger of claim 1, further comprising a linear actuator for sliding the two auger sections relative to each other.

\* \* \* \* \*